(12) United States Patent
Yoda (10) Patent No.: US 10,493,776 B2
(45) Date of Patent: Dec. 3, 2019

(54) ADJUSTMENT METHOD OF PRINTING APPARATUS

(71) Applicant: SEIKO EPSON CORPORATION, Tokyo (JP)

(72) Inventor: Tomohiro Yoda, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/025,189

(22) Filed: Jul. 2, 2018

(65) Prior Publication Data

US 2019/0001709 A1 Jan. 3, 2019

(30) Foreign Application Priority Data

Jul. 3, 2017 (JP) .................. 2017-130290

(51) Int. Cl.
*B41J 11/00* (2006.01)
*H04N 1/60* (2006.01)
*B41J 2/01* (2006.01)
*B41J 2/205* (2006.01)

(52) U.S. Cl.
CPC ............ *B41J 11/002* (2013.01); *B41J 2/01* (2013.01); *B41J 2/205* (2013.01); *H04N 1/605* (2013.01)

(58) Field of Classification Search
CPC . B41J 2/01; B41J 2/205; B41J 11/002; H04N 1/605
See application file for complete search history.

(56) References Cited

U.S. PATENT DOCUMENTS

| 6,398,428 B1 * | 6/2002 | Szajewski et al. .... G03D 13/00 396/575 |
| 6,464,412 B1 * | 10/2002 | Stoebe et al. .......... G03D 13/00 396/575 |
| 2016/0231670 A1 * | 8/2016 | Takahashi et al. ......................... G03G 15/2039 |

FOREIGN PATENT DOCUMENTS

WO WO-2017/033327 A1 3/2017

* cited by examiner

*Primary Examiner* — Anh T Vo
(74) *Attorney, Agent, or Firm* — Foley & Lardner LLP (57) ABSTRACT

An adjustment method of a printing apparatus capable of properly drying a medium is provided. An adjustment method of a printing apparatus is provided and the adjustment method includes printing on a medium a plurality of patches having different amounts of liquid discharged from a printing unit, and adjusting a heating temperature of a drying unit configured to heat the medium by referring to correspondence data indicating a correspondence relationship between the heating temperature of the drying unit and an amount of evaporation of the liquid caused by the drying unit, based on a dry condition of the patch that have been subjected to drying by the drying unit.

4 Claims, 4 Drawing Sheets

Fig. 7

ADJUSTMENT METHOD OF PRINTING APPARATUS

BACKGROUND

1. Technical Field

The disclosure relates to an adjustment method of a printing apparatus such as an ink jet printer.

2. Related Art

There is a printing apparatus including a printing unit that discharges liquid onto a medium to print an image including characters, pictures, and the like on the medium, and a drying unit that dries the medium by heating to accelerate fixing of the printed image. International publication WO 2017/033327, which is an example of such a printing apparatus, discloses a printer that prints a patch chart in which a discharge rate of liquid per unit area gradually changes on a medium. The printer measures the printed patch chart with a colorimeter to obtain a saturated amount of liquid on the medium. Obtaining such a saturated amount of liquid on the medium enables printing with accurate color reproduction of liquid.

The saturated amount of liquid differs depending on the type of medium. Specifically, for printing with accurate color reproduction, an appropriate discharge rate of liquid differs depending on the type of medium. A change in the discharge rate of liquid leads to a change in the temperature made by the drying unit for drying the medium. Accordingly, in changing the discharge rate of liquid, the temperature of the drying unit may be adjusted.

SUMMARY

An adjustment method of a printing apparatus capable of properly drying a medium is provided.

According to one exemplary embodiment, an adjustment method of a printing apparatus is provided. The adjustment method includes printing on a medium a plurality of patches having different amounts of liquid discharged from a printing unit, and adjusting a heating temperature of a drying unit by referring to correspondence data indicating a correspondence relationship between the heating temperature of the drying unit and an amount of evaporation of the liquid caused by the drying unit, based on a dry condition of the plurality of patches that have been subjected to drying by the drying unit configured to heat the medium.

Depending on the heating temperature of the drying unit, after the medium on which the plurality of patches are printed is heated by the drying unit, the same medium may include fully dried patches and not-fully dried patches. In such a case, it is observed that when an image is printed on a medium using an amount of liquid that is equal to the amount of liquid of the not-fully dried patches, the current heating temperature of the drying unit results in insufficient drying.

Here, by referring to correspondence data indicating the correspondence relationship between the heating temperature of the drying unit and the amount of evaporation of liquid caused by the drying unit, a difference in amount of liquid between a fully dried patch and a not-fully dried patch is determined and thus a heating temperature of the drying unit for drying the latter patches is obtained.

To be specific, according to the method described above, the heating temperature of the drying unit for drying a medium on which an image is printed at a desired amount of liquid can be calculated, based on the dry condition of the plurality of patches printed on a medium. Therefore, the medium can be properly dried.

In the adjustment method of the printing apparatus, the correspondence data may be set depending on a difference in a heating time of the drying unit for the medium. According to this method, the heating temperature of the drying unit for drying the medium on which an image is printed at a desired amount of liquid is calculated depending on the difference in the heating time of the drying unit.

In the adjustment method of the printing apparatus, after the heating temperature of the drying unit is adjusted, the plurality of patches having different amounts of the liquid may be printed on the medium again. According to this method, whether the heating temperature of the drying unit is properly adjusted is checked, based on the dry condition of the plurality of patches printed again.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

Figure 1:
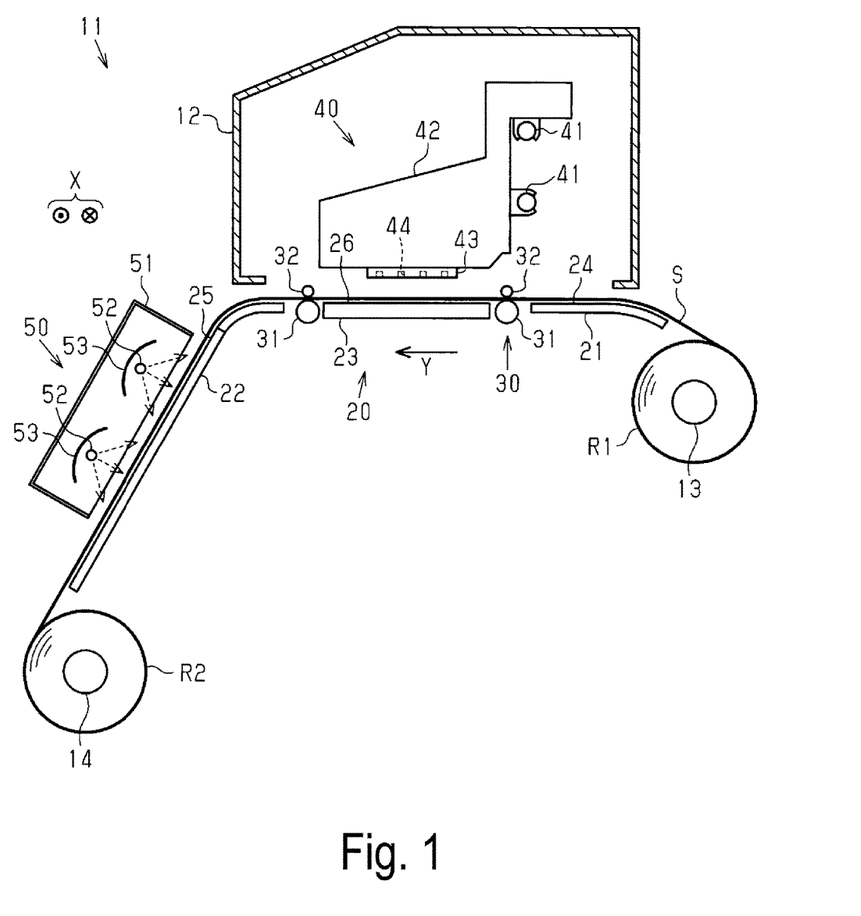
FIG. 1 is a schematic side view of a printing apparatus in one exemplary embodiment.

One exemplary embodiment of an adjustment method of a printing apparatus is described below while referencing the accompanying drawings. The printing apparatus according to some exemplary embodiments is, for example, an ink jet-type printer. As illustrated in FIG. 1, the printing apparatus 11 includes a housing 12, a medium support unit 20, and transport units 30 configured to transport a medium S in a transport direction Y along the medium support unit 20. The medium support unit 20 supports the medium S. A transport unit 30 transports the medium S in the transport direction Y along the medium support unit 20. The printing apparatus 11 includes a printing unit 40 and a drying unit 50. The printing unit 40 prints an image including, but not limited to, characters or pictures on the medium S. The drying unit 50 dries the medium S which has been subjected to printing by the printing unit 40. The printing apparatus 11 includes a feeding shaft 13 and a winding shaft 14. The feeding shaft 13 feeds the medium S toward the medium support unit 20. The winding shaft 14 winds the medium S which has been subjected to printing by the printing unit 40.

The feeding shaft 13 detachably supports a roll body R1 in which the medium S has been laminated by winding. The feeding shaft 13 rotates to wind off the medium S from the roll body R1 and thus to feed the medium S. In one exemplary embodiment, the medium S is a sheet of paper.

The medium support unit 20 includes a first guide portion 21, a second guide portion 22, and a support portion 23. The first guide portion 21, the second guide portion 22, and the support portion 23 may each be made of a plate member. The first guide portion 21 supports the medium S, which has been fed from the feeding shaft 13, to guide the medium S toward the inside of the housing 12. The support portion 23 supports the medium S, which has been guided by the first guide portion 21. The second guide portion 22 supports the medium S, which has passed on the support portion 23, to guide the medium S toward the outside of the housing 12. In other words, the first guide portion 21 is arranged upstream from the support portion 23 in the transport direction Y. The second guide portion 22 is arranged downstream from the support portion 23 in the transport direction Y. In some exemplary embodiments, the transport direction Y in which the medium S is transported indicates a direction in which the medium S moves on the medium support unit 20.

The first guide portion 21 and the second guide portion 22 respectively have top surfaces serving as guide surfaces 24 and 25 to guide the medium S. The support portion 23 has a top surface serving as a support surface 26 to support the medium S. In one exemplary embodiment, the support portion 23 is formed such that the support surface 26 extends horizontally. The first guide portion 21 and the second guide portion 22 are respectively formed such that the guide surfaces 24 and 25 are partially bent against the support surface 26.

Two transport units 30 are included such that one transport unit 30 is arranged between the first guide portion 21 and the support portion 23 and the other transport unit 30 is arranged between the support portion 23 and the second guide portion 22, in the transport direction Y. The transport unit 30 includes driving rollers 31 and driven rollers 32. The driven rollers 32 are rotatable following the rotations of the respective driving rollers 31. Each driving roller 31 is capable of driving a rotation. Each driven roller 32 is capable of rotating to be driven by the rotation of the corresponding driving roller 31. The transport unit 30 transports the medium S along the medium support unit 20 by the rotation of the driving roller 31 and the driven roller 32 with the medium S held by the driving roller 31 and the driven roller 32. In one exemplary embodiment, the driving roller 31 is arranged to be capable of contacting the medium S from below. The driven roller 32 is arranged to be capable of contacting the medium S from above.

The printing unit 40 is arranged inside the housing 12 to face the support portion 23. The printing unit 40 includes a guide shaft 41, a carriage 42, and a head 43 installed in the carriage 42. The guide shaft 41 extends in a width direction X of the medium S to be transported. The carriage 42 is supported by the guide shaft 41. The head 43 is installed in the carriage 42. The carriage 42 is movable along the guide shaft 41. In other words, the carriage 42 is configured to be movable in the width direction X. In one exemplary embodiment, two guide shafts 41 are provided.

The head 43 is installed in the carriage 42 to be exposed on the bottom surface of the carriage 42. The head 43 includes a plurality of nozzles 44 configured to discharge ink as an example of liquid on its bottom surface facing the support portion 23. The head 43 discharges ink from any of the nozzles 44 onto the medium S supported by the support portion 23 to print an image on the medium S. The printing unit 40 according to one exemplary embodiment is configured to discharge, for example, four color inks: cyan, magenta, yellow, and black.

The drying unit 50 is arranged outside the housing 12 to face the second guide portion 22. The drying unit 50 includes a casing 51, a heating element 52, and a reflector plate 53. The casing 51 accommodates the heating element 52 and the reflector plate 53. The casing 51 has a box shape and includes an opening facing the guide surface 25 of the second guide portion 22. The heating element 52 generates heat by electric current flowing in. In one exemplary embodiment, two heating elements 52 are each formed from, for example, a rod heater extending in the width direction X, and are arranged to be spaced from each other in the transport direction Y. The reflector plate 53 is a plate member which is bent to surround an upper portion of the heating element 52. The reflector plate 53 reflects infrared rays generated by the heating element 52 toward the guide surface 25 of the second guide portion 22.

The drying unit 50 heats the medium S located on the guide surface 25 of the second guide portion 22 by heat generated by the heating element 52. In this way, solvent components such as water contained in ink are evaporated by heating caused by the drying unit 50, and the medium S is dried. This drying accelerates fixing of the image printed on the medium S. The drying unit 50 is configured to change the heating temperature for heating the medium S. A drying capability of the drying unit 50 to dry the medium S is determined by a heating time for heating the medium S. In the drying unit 50 according to one exemplary embodiment, a heating temperature of 60° C. is set as initial setting. The drying unit 50 heats the medium S so that the temperature of the medium S becomes equal to the set heating temperature. Specifically, in a case of the heating temperature of 60° C. being set, the drying unit 50 heats the medium S so that the temperature of the medium S becomes equal to around 60° C.

Rotation of the winding shaft 14 winds the medium S which has been heated by the drying unit 50. The winding of the medium S onto the winding shaft 14 produces a roll body R2. The winding shaft 14 detachably holds the roll body R2. The printing apparatus 11 according to one exemplary embodiment is configured to perform printing on not only continuous paper to be fed from the roll body R1 but also cut paper.

In one exemplary embodiment, the width direction X of the medium S corresponds to the longitudinal direction of the feeding shaft 13. The feeding shaft 13 whose longitudinal direction corresponds to a shaft direction rotates to feed the medium S. Accordingly, the medium S is fed from the feeding shaft 13 in the circumferential direction of the feeding shaft 13. The medium S which has been fed from the feeding shaft 13 moves along the medium support unit 20 in the transport direction Y. In other words, the movement of the medium S along the medium support unit 20 may be referred to as the movement in the circumferential direction of the feeding shaft 13. The longitudinal direction and the circumferential direction of the feeding shaft 13 indicate different directions from each other. In other words, in one exemplary embodiment, the width direction X and the transport direction Y indicate different directions from each other.

In one exemplary embodiment, the printing unit 40 prints an image on the medium S with the head 43 moving along with the carriage 42 back and forth. Accordingly, the transport unit 30 stops transporting the medium S while the printing unit 40 is moving over the medium S in the width direction X, that is, while the printing unit 40 is scanning the medium S.

When the printing unit 40 finishes moving over the medium S, for example, when the printing unit 40 passes over the medium S and then is positioned at an internal edge of the housing 12 in the width direction X, the transport unit 30 transports the medium S by a given amount. In this way, the transport unit 30 alternately rotates and stops the driving roller 31 to intermittently transport the medium S. The transport unit 30 according to one exemplary embodiment transports the medium S by a given amount every time the printing unit 40 moves over the medium S in the width direction X. In other words, the medium S is transported by a given amount every time the printing unit 40 has scanned the medium S once.

Next, a printing method by the printing apparatus 11 according to one exemplary embodiment for performing a printing operation on the medium S will be described with reference to FIGS. 2 and 3. In the following, a printing region T indicates each of a plurality of regions into which a region to be subjected to printing on the medium S is divided in the transport direction Y. In one exemplary embodiment, particularly, the printing region T is, for convenience of explanation, defined as each of a plurality of regions into which a region to be subjected to printing on the medium S is divided at regular intervals in the transport direction Y.

The printing apparatus 11 according to one exemplary embodiment is configured to change the number of passes by the printing unit 40, which prints an image on the medium S. In one exemplary embodiment, the number of passes by the printing unit 40 indicates the number of times that the printing unit 40 performs a printing operation on one printing region T. In other words, the number of passes may be referred to as the number of times that the printing unit 40 scans one printing region T. An image to be printed on one printing region T is formed by performing of a printing operation for the number of passes set in the printing unit 40.

Figure 2:
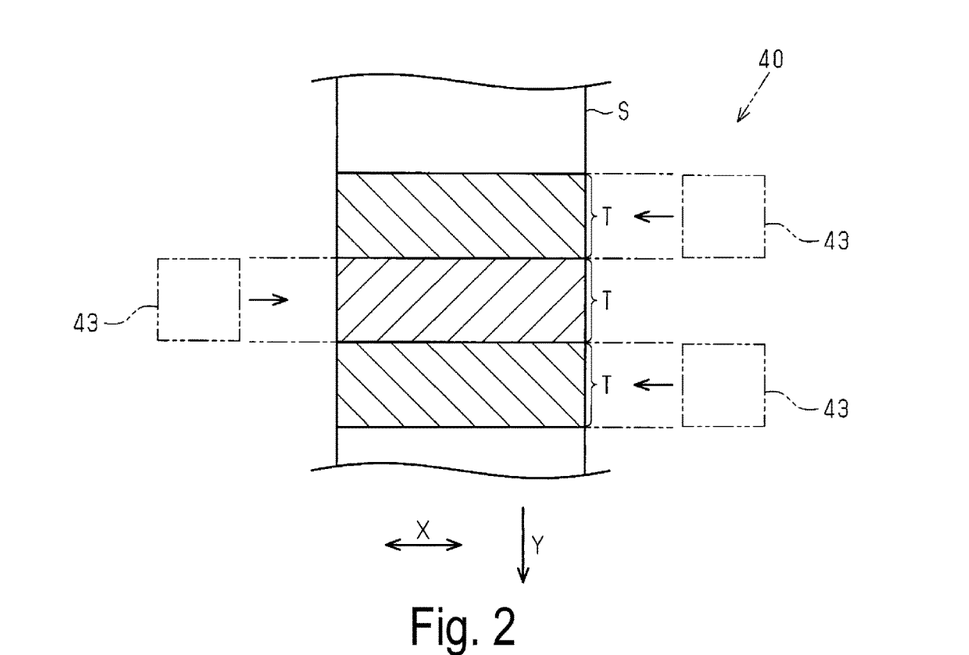
FIG. 2 is a plan view illustrating an operation of a printing unit by one-pass printing.

FIG. 2 illustrates a manner in which the printing unit 40 performs one-pass printing on the medium S. As illustrated in FIG. 2, the printing unit 40 for the one-pass printing on the medium S performs a printing operation on one printing region T once. Specifically, in the one-pass printing on the medium S, the printing unit 40 scans one printing region T once. In the one-pass printing on the medium S, the printing unit 40 finishes printing on one printing region T for every scanning process. The medium S is transported by a length of the printing region T in the transport direction Y for every scanning process by the printing unit 40.

Figure 3:
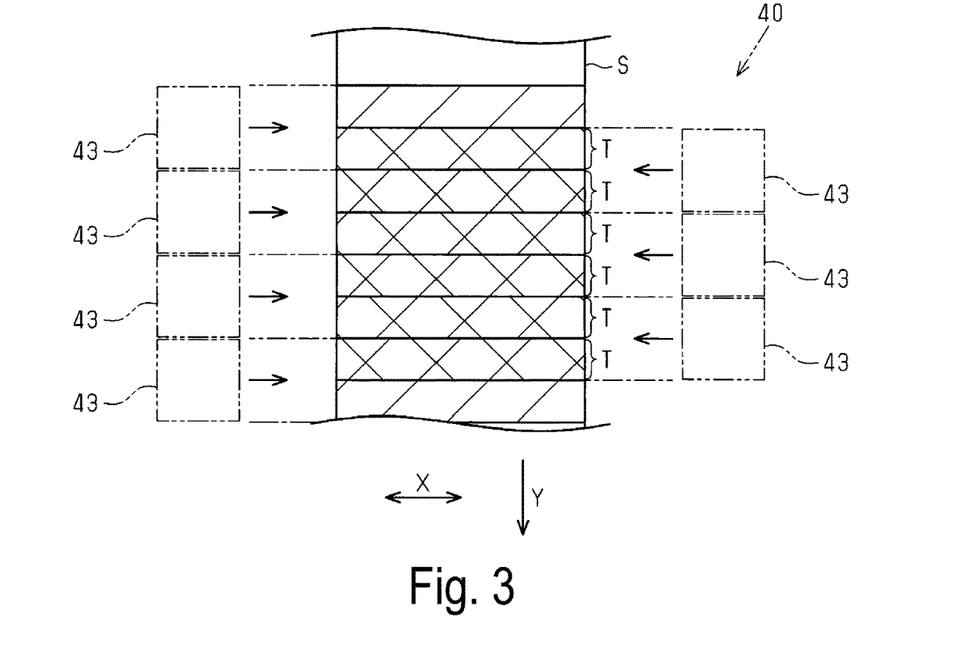
FIG. 3 is a plan view illustrating an operation of the printing unit by two-pass printing.

FIG. 3 illustrates a manner in which the printing unit 40 performs two-pass printing on the medium S. As illustrated in FIG. 3, in the two-pass printing on the medium S, the printing unit 40 performs a printing operation on one printing region T twice. Specifically, in the two-pass printing on the medium S, the printing unit 40 scans one printing region T twice. In the two-pass printing on the medium S, the printing unit 40 finishes printing on one printing region T for every two scanning processes. The medium S is transported by a length of the printing region T in the transport direction Y for every two scanning processes by the printing unit 40.

In the printing apparatus 11 according to one exemplary embodiment, the larger the number of passes by the printing unit 40, the higher the quality of an image printed on the medium S. In the printing unit 40, when the head 43 is manufactured, the nozzles 44 of the head 44 may vary in position. The landing position of ink discharged from each nozzle 44 depends on the positional accuracy of the nozzle 44. For that reason, the variations of positions of the nozzles 44 may cause variations of landing positions of ink. For example, in the one-pass printing, since the printing unit 40 prints an image on one printing region by performing a printing operation just once, the variations of positions of the nozzles 44 may cause uneven printing such as banding on the printed image.

By contrast, in the two-pass printing on a medium, since the printing unit 40 prints an image on one printing region by performing the printing operation twice, the variations of landing positions of ink are made uniform, as compared with the one-pass printing. Accordingly, by performing the printing operation multiple times to print an image, uneven printing due to variations of positions of the nozzles 44 is reduced, and thus the quality of the image is increased. The printing apparatus 11 according to one exemplary embodiment is capable of selecting the number of passes for the printing unit 40, from among one-pass, two-pass, three-pass, four-pass, and five-pass. In other words, the printing apparatus 11 according to one exemplary embodiment is capable of selecting the quality of an image to be printed from five levels.

As illustrated in FIGS. 2 and 3, a transportation amount per one time for intermittently transporting the medium S in the transport unit 30 is equal to a length of the printing region T in the transport direction Y. In the two-pass printing, the length of the printing region T in the transport direction Y is about a half the length for the one-pass printing. In other words, in the two-pass printing, a transportation amount by the transport unit 30 per one time for intermittently transporting the medium S in every scanning process by the printing unit 40 is about a half the transportation amount per one time for the one-pass printing.

As the transportation amount by the transport unit 30 per one time for intermittently transporting the medium S becomes smaller, a transportation time to transport the medium S becomes longer. For example, in the two-pass printing, the transportation time to transport the medium S is about twice the transportation time for the one-pass printing.

In one exemplary embodiment, as the transportation amount per one time for intermittently transporting the medium S becomes longer, the heating time of the drying unit 50 for heating the medium S becomes longer accordingly. For that reason, an approximately doubled increase in the transportation time by the transport unit 30 results in an approximately doubled increase in the heating time of the drying unit 50 for heating the medium S. Accordingly, in one exemplary embodiment, the heating time of the drying unit 50 is determined by the number of passes for the printing unit 40.

In other words, in a case where the printing unit 40 prints an image by N-pass printing (N=2, 3, 4, 5), the transportation amount for intermittently transporting the medium S in the transport unit 30 for every one scanning by the printing unit 40 is about 1/N of the transportation amount for one-pass printing. In a case where the printing unit 40 prints an image by N-pass printing (N=2, 3, 4, 5), the heating time of the drying unit 50 is about N times the heating time for the one-pass printing. Consequently, in one exemplary embodiment, the quality of an image printed and time required to print the image have a trade-off relationship.

A long heating time of the drying unit 50 for heating the medium S may cause dry damage, such as waving and warp, to the medium S depending on the type of the medium S. Conversely, a short heating time of the drying unit 50 for heating the medium S may cause the medium S not to be fully dried, and the drying of ink discharged on the medium S becomes insufficient. For that reason, the printing apparatus 11 according to one exemplary embodiment is configured to properly dry the medium S by adjusting the heating temperature of the drying unit 50.

Next, a procedure for adjusting a heating temperature of the drying unit 50 included in the printing apparatus 11, which is configured as described above, will be described. To begin with, a user determines a quality of an image to be printed to cause the printing apparatus 11 to print the image. The user selects a desired image quality from five levels of image quality, which are selectable in the printing apparatus 11 according to one exemplary embodiment, to determine the quality of the image. The user sets the selected image quality in the printing apparatus 11. The quality of the image may be set via either an operation unit such as buttons or a touch panel of the printing apparatus 11 or an external terminal such as a computer.

When the quality of the image is set in the printing apparatus 11, the number of passes by the printing unit 40 is changed to correspond to the quality of the image determined by the user. In other words, the user first determines the number of passes for the printing unit 40 for printing an image to cause the printing apparatus 11 to print the image. In the printing unit 40 according to one exemplary embodiment, the number of passes is set to one-pass as initial setting.

Next, the user determines a color density of the image to be printed. Accordingly, the printing apparatus 11 according to one exemplary embodiment is capable of changing the color density to print the image. To determine the color density of the image, the user causes the printing apparatus 11 to print a color pattern 60 (see FIG. 4) to check the degree of coloring of ink on the medium S. Then, the printing apparatus 11 prints the color pattern 60 on the medium S at the number of passes set by the user.

Figure 4:
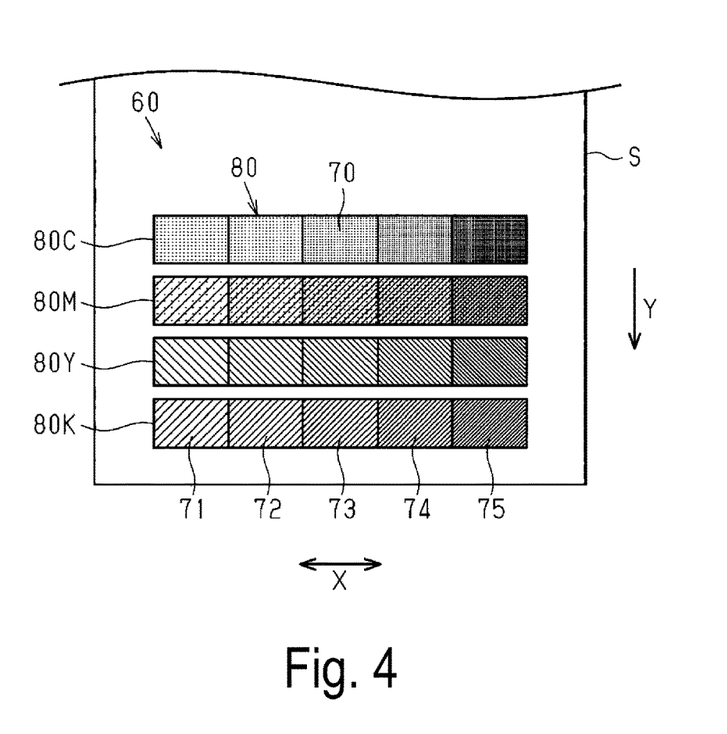
FIG. 4 illustrates an example of a color pattern.

As illustrated in FIG. 4, the color pattern 60 includes a patch group 80, in which a plurality of patches 70 each indicating a single hue are serially arranged in the width direction X. The color pattern 60 according to one exemplary embodiment includes a plurality of patch groups 80. The color pattern 60 includes four patch groups 80 in total, which are arranged in the transport direction Y.

The color pattern 60 includes a patch group 80C for cyan, a patch group 80M for magenta, a patch group 80Y for yellow, and a patch group 80K for black, which are sequentially arranged in order from upstream to downstream in the transport direction Y. The patch groups 80C, 80M, 80Y, and 80K respectively correspond to cyan, magenta, yellow, and black ink, which are each a single color.

Each patch group 80 includes the plurality of patches 70, which have different color densities from each other and which are arranged in the width direction X. The patch group 80 according to one exemplary embodiment includes five patches 70. The patch group 80 includes a first patch 71, a second patch 72, a third patch 73, a fourth patch 74, and a fifth patch 75, which are sequentially arranged in order from the left to the right in the width direction X in FIG. 4.

The patch group 80 is made up of the patches 70, which are sequentially arranged in order from the left to the right in the width direction X in FIG. 4 as the color density of the patches 70 gradually increases. Accordingly, in the patch group 80, the first patch 71 has the lowest color density, whereas the fifth patch 75 has the highest color density. In other words, the patch group 80 indicates gradations of one hue.

The patches 70, which constitute the patch group 80, are formed to correspond to color densities to be selectable in the printing apparatus 11. In other words, the color pattern 60 according to one exemplary embodiment includes the plurality of patches 70, which respectively indicate different hues in the transport direction Y and which are arranged to have different color densities from each other in the width direction X. The patches 70, which constitute the patch group 80, may be provided to correspond to color densities to be selectable in the printing apparatus 11. Specifically, the printing apparatus 11 according to one exemplary embodiment is capable of changing the color densities of the image among five levels.

In one exemplary embodiment, the scale of color density to be selectable for the image in the printing apparatus 11 is referred to as a color density level. Specifically, the printing apparatus 11 according to one exemplary embodiment is capable of selecting a color density of the image from color density levels 1 to 5. The higher the color density level, the higher the color density.

In the patch group 80, the first patch 71 is formed at color density level 1, the second patch 72 at color density level 2, the third patch 73 at color density level 3, the fourth patch 74 at color density level 4, and the fifth patch 75 at color density level 5. The higher the color density level of the patch 70, the denser the color of the patch 70 printed. The printing apparatus 11 may print the color pattern 60 to form the patch 70 along with an identifier indicating the color density of the patch 70 so that the user easily identifies the color density of the patch 70.

The color density of the image is determined by an amount of ink discharged onto the medium S per unit area. Accordingly, the more the amount of ink discharged per unit area, the higher the color density of ink. In one exemplary embodiment, an amount of ink discharged from the printing unit 40 onto the medium S per unit area is referred to as a liquid amount. Specifically, the printing apparatus 11 prints on the medium S the plurality of patches 70 each having a different liquid amount of ink to print the color pattern 60. In other words, a color density level indicates the scale of liquid amount.

In one exemplary embodiment, the color density level is set to have a linear relationship with the liquid amount. Specifically, the liquid amount corresponding to color density level 3 is set to three times the liquid amount corresponding to color density level 1. The liquid amount corresponding to color density level 5 is set to five times the liquid amount corresponding to color density level 1. For that reason, the difference in liquid amount between the adjacent patches 70 of the patch group 80 is constant. The patch group 80 includes the patches 70, which are sequentially arranged in order from the left to the right in the width direction X in FIG. 4 such that the liquid amount of the patches 70 constantly increases.

The user visually checks the printed color pattern 60 to identify the degree of coloring of the patches 70. The user selects one of the patches 70 with a desired color from the printed color pattern 60 to determine a color density of the image.

The user sets the selected color density of the patch 70 as the color density level in the printing apparatus 11. Specifically, the user sets a desired one of color density levels 1 to 5 in the printing apparatus 11. The color density of the image may be set via either an operation unit such as buttons or a touch panel of the printing apparatus 11 or an external terminal such as a computer.

When the color density of the image is set, the liquid amount of ink to be discharged from the printing unit 40 is changed to correspond to the color density selected by the user. In other words, the user selects and determines the liquid amount to be discharged from the printing unit 40 to cause the printing apparatus 11 to print the image. In the printing unit 40 according to one exemplary embodiment, the liquid amount (color density of an image) is set to a liquid amount corresponding to color density level 1 as initial setting.

In short, the user first selects a quality of an image and then selects a color density of the image by using the color pattern 60 to cause the printing apparatus 11 to print the image. Accordingly, at this timing, the liquid amount of ink to be discharged onto the medium S and the heating time of the drying unit 50 for the medium S are determined.

In one exemplary embodiment, an amount of ink to be evaporated by heating caused by the drying unit 50 is determined by the heating temperature and the heating time of the drying unit 50. In one exemplary embodiment, an evaporation amount refers to an amount of ink per unit area to be evaporated from the medium S by heating caused by the drying unit 50. The ink discharged onto the medium S is partially absorbed by the medium S. In one exemplary embodiment, an absorbed amount refers to an amount of ink per unit area absorbed by the medium S out of ink discharged onto the medium S from the printing unit 40. The medium S absorbs the ink until the ink is heated by the drying unit 50 after the ink is discharged from the printing unit 40. The maximum absorbed amount of ink absorbed by the medium S depends on the type of medium S.

To dry the medium S and fix the printed image, ink remaining on the surface of the medium S out of the ink discharged from the printing unit 40 may be evaporated. Specifically, the heating temperature of the drying unit 50 may be set to satisfy evaporation amount≥(liquid amount−absorbed amount). To reduce damage to the medium S due to heating, the heating temperature of the drying unit 50 may be set to satisfy evaporation amount=(liquid amount−absorbed amount).

Next, in a case where the image is printed at the color density (liquid amount) of the patch 70 selected from the color pattern 60, the user checks whether to dry the patches 70 at the current heating temperature of the drying unit 50. For this purpose, the user causes the printing apparatus 11 to print a check pattern 90 for checking the dry condition of the medium S (see FIG. 5). Specifically, the printing apparatus 11 prints the check pattern 90 on the medium S at the number of passes set by the user, as in the case of the color pattern 60.

Figure 5:
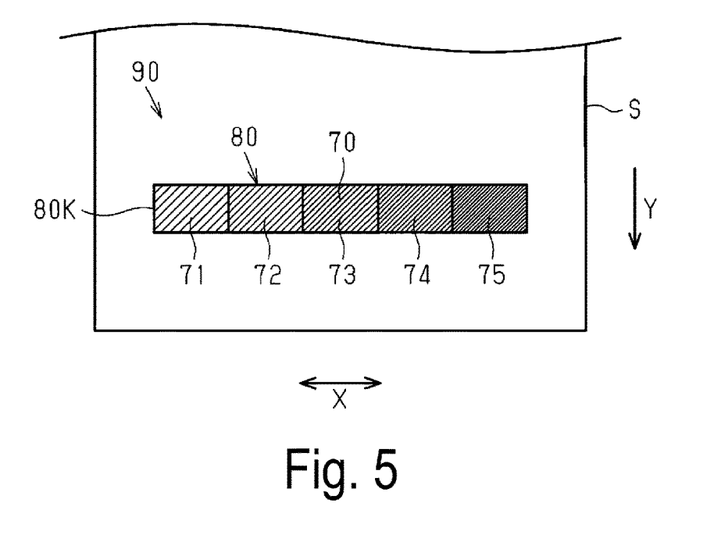
FIG. 5 illustrates an example of a check pattern.

As illustrated in FIG. 5, the check pattern 90 includes a patch group 80 in which a plurality of patches 70 each indicating a single hue are serially arranged in the width direction X. In one exemplary embodiment, the check pattern 90 is made up of one patch group 80, which is different from the color pattern 60. The check pattern 90 is made up of, for example, a patch group 80K for black.

The patch group 80 of the check pattern 90 is made up of five patches 70, as with the patch group 80 of the color pattern 60. Accordingly, the patch group 80 of the check pattern 90 is made up of the patches 70, which are sequentially arranged in order from the left to the right in the width direction X in FIG. 5 as the color density of the patches 70 gradually increases. Specifically, by printing on the medium S the plurality of patches 70 each having a different liquid amount of ink, the printing apparatus 11 prints the check pattern 90.

In the patch group 80, a first patch 71 is formed at color density level 1, a second patch 72 at color density level 2, a third patch 73 at color density level 3, a fourth patch 74 at color density level 4, and a fifth patch 75 at color density level 5. In other words, the check pattern 90 is made up of the plurality of patches 70, which include the patch 70 printed at a liquid amount corresponding to the color density level selected by the user. The printing apparatus 11 may print the check pattern 90 to form the patch 70 along with an identifier indicating the color density of the patch 70, so that the user easily identifies the color density of the patch 70.

Next, the user visually checks the printed check pattern 90 to identify whether the patch 70 with the selected color density level is fully dry. For example, the user touches the respective patches 70 of the check pattern 90 with her/his finger to identify whether the touched patch 70 is dry. The patch 70 with a higher color density level is hard to dry because of a larger liquid amount. In other words, the first patch 71 is the easiest to dry and the fifth patch 75 is the hardest to dry, in the patch group 80. Each dry condition of the patches 70 may be determined, based on, for example, "Determination of through-dry state" standardized as JIS K5600-3-3.

In a case where the patch 70 selected by the user is fully dry, it is found that when an image is printed at the color density of the selected patch 70, that is, at a liquid amount equal to the liquid amount of the selected patch 70, the image can be dried at the current heating temperature of the drying unit 50. Conversely, in a case where the patch 70 selected by the user is not fully dry, it is determined that when an image is printed at a liquid amount equal to the liquid amount of the selected patch 70, the current heating temperature of the drying unit 50 is not enough to dry the image. In a case where the patch 70 selected by the user is not fully dry, the user adjusts the heating temperature of the drying unit 50 based on the dry condition of the check pattern 90. This method will be described later.

After changing the heating temperature of the drying unit 50, the user causes the printing apparatus 11 to print the check pattern 90 again. The user visually checks the printed check pattern 90 to identify whether the selected patch 70 is fully dried at the changed heating temperature of the drying unit 50. In a case where the selected patch 70 is fully dry, the user causes the printing apparatus 11 to print an image.

The user causes the printing apparatus 11 to print the check pattern 90. This enables the user to check in advance the dry condition of the medium S when an image is printed at the selected image quality and color density. The user causes the printing apparatus 11 to actually print an image at the selected image quality and color density. This also enables the user to check in advance the dry condition of the medium S. In this case, however, unless the printed image is fully dry, the user adjusts the heating temperature of the drying unit 50, based on, for example, user's experience.

After adjusting the heating temperature of the drying unit 50, the user causes the printing apparatus 11 to print an image again to check the dry condition. Accordingly, the user repeatedly prints an image and adjusts the heating temperature until the heating temperature becomes appropriate to dry the image. For that reason, printing an image on the medium S to check the dry condition of the medium S often consumes more medium S and more ink than printing the check pattern 90 to check the dry condition of the medium S.

The printing apparatus 11 according to one exemplary embodiment is configured to properly adjust the heating temperature of the drying unit 50, based on the dry condition of the check pattern 90. Accordingly, with the printing apparatus 11, printing the check pattern 90 to check a dry condition of the medium S reduces the consumption of medium S and ink.

Next, a method of adjusting the heating temperature of the drying unit 50 according to a dry condition of the check pattern 90 will be described. To begin with, it is assumed that the number of passes of the printing unit 40 is four-pass and a color density of an image has been selected as color density level 5 by a user.

In a case where the fifth patch 75, which is a selected patch 70, is not fully dry, the user checks the patch 70 which is fully dry and the patch 70 which is not fully dry, out of the check pattern 90. For example, it is assumed that when the heating temperature of the drying unit 50 is 60° C., the first patch 71, the second patch 72, and the third patch 73 are fully dry, but the fourth patch 74 and the fifth patch 75 are not fully dry. In this situation, the user checks the dry condition of the patch 70 of the check pattern 90, and thus finds that a heating temperature of 60° C. by the drying unit 50 can dry an amount of liquid corresponding to color density level 3. Subsequently, the user considers at what degree the temperature is to be increased from the current heating temperature of the drying unit 50 to dry an amount of liquid corresponding to color density level 5.

As described above, the condition for drying the medium S is evaporation amount≥(liquid amount−absorbed amount). The liquid amount is determined by the color density level, and the evaporation amount is determined by the heating temperature and the heating time of the drying unit 50. In one exemplary embodiment, since the heating time of the drying unit 50 is determined in advance by the number of passes for the printing unit 40, that is, the quality of an image, the evaporation amount is determined by the heating temperature of the drying unit 50. Accordingly, finding the absorbed amount of the medium S can determine the heating temperature of the drying unit 50.

Figure 6:
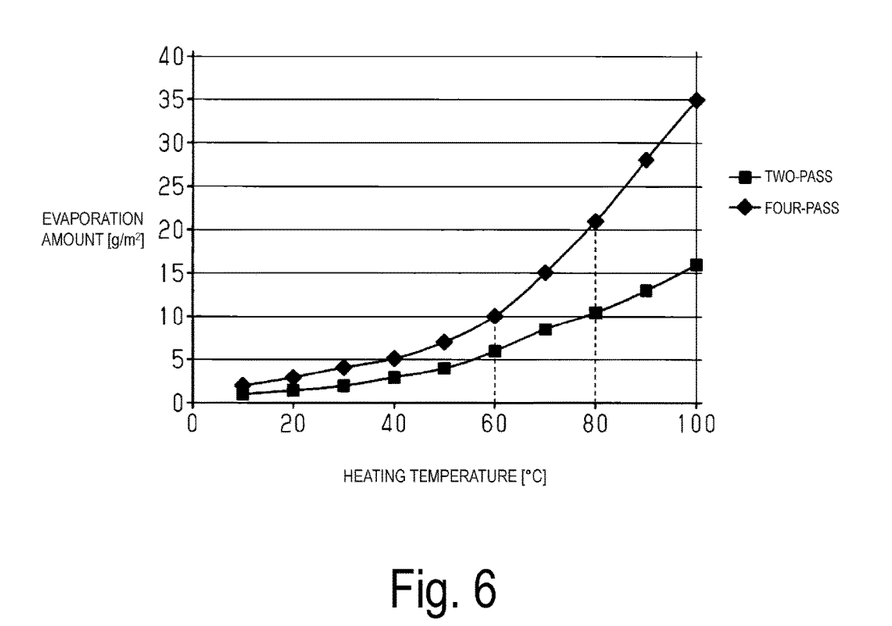
FIG. 6 is a graph of a correspondence relationship between a heating temperature of a drying unit and an amount of evaporation of liquid caused by the drying unit, as an example of correspondence data.

A graph illustrated in FIG. 6 is a graph illustrating correspondence relationships between a heating temperature of the drying unit 50 and an evaporation amount of ink caused by the drying unit 50 for the respective number of passes to be selectable in the printing apparatus 11. In one exemplary embodiment, illustrated are a correspondence relationship in a case where the number of passes of the printing unit 40 is four-pass and a correspondence relationship in a case where the number of passes is two-pass, as typical examples. The graph illustrated in FIG. 6 is an example of correspondence data indicating a correspondence relationship between a heating temperature of the drying unit 50 and an evaporation amount of liquid caused by the drying unit 50. In other words, the correspondence data is set depending on a difference in heating time of the drying unit 50 to be selectable in the printing apparatus 11 (for each number of passes of the printing unit 40).

As illustrated in FIG. 6, the evaporation amount of ink increases with a larger heating temperature of the drying unit 50. The evaporation amount of ink also increases with a larger number of passes of the printing unit 40, that is, with a longer heating time. In view of the correspondence relationship between the heating time and the evaporation amount of ink in the drying unit 50 for four-pass printing, the evaporation amount of ink in a case of a heating temperature of 60° C. is about 10 g/m². The evaporation amount of ink in the case of a heating temperature of 80° C. is about 21 g/m². In view of the correspondence relationship between the heating time and the evaporation amount of ink in the drying unit 50 for two-pass printing, the evaporation amount of ink in the case of a heating temperature of 60° C. is about 6 g/m². The evaporation amount of ink in the case of a heating temperature of 80° C. is about 11 g/m².

In one exemplary embodiment, in a case where the liquid amount corresponding to color density level 1 is 5 g/m², the liquid amount corresponding to color density level 3 is 15 g/m². The liquid amount corresponding to color density level 5 is 25 g/m². It has been observed from the check pattern 90 that the third patch 73 is dry at a heating temperature of 60° C. Accordingly, the absorbed amount of the medium S is found by subtracting the evaporation amount in the case of a heating temperature of 60° C. from the liquid amount corresponding to color density level 3. Specifically, the absorbed amount of the medium S is 15−10=5 g/m². The calculated absorbed amount indicates an amount absorbed by at least the medium S in the four-pass printing.

To dry the fifth patch 75 with color density level 5, an amount obtained by subtracting the absorbed amount from the liquid amount corresponding to color density level 5 can be evaporated. Specifically, it is found that an amount of ink of 25−5=20 g/m² can be evaporated by heating caused by the drying unit 50. Referring to the graph illustrated in FIG. 6, an evaporation amount of 20 g/m² in the four-pass printing is found at about a heating temperature of 80° C. In other words, changing the heating temperature of the drying unit 50 from 60° C. to 80° C. provides a drying capability for drying the fifth patch 75.

Next it is assumed that the number of passes of the printing unit 40 is two-pass and a color density of an image has been selected as color density level 3 by the user. In a case where the third patch 73, which is a selected patch 70, is not fully dry, the user checks the patch 70 which is fully dry and the patch 70 which is not fully dry, out of the check pattern 90. For example, it is assumed that when the heating temperature of the drying unit 50 is 60° C., the first patch 71 and the second patch 72 are fully dry, but the third patch 73, the fourth patch 74 and the fifth patch 75 are not fully dry. In this situation, the user checks the dry condition of the patch 70 of the check pattern 90, and thus finds that when the heating temperature of the drying unit 50 is 60° C., an amount of liquid corresponding to color density level 2 can be dried. Subsequently, the user considers at what degree the temperature is to be increased from the current heating temperature of the drying unit 50 to dry an amount of liquid corresponding to color density level 3.

Since it has been observed from the check pattern 90 that the second patch 72 is dry at a heating temperature of 60° C., the absorbed amount of the medium S is found by subtracting the evaporation amount in the case of a heating temperature of 60° C. from the liquid amount corresponding to color density level 2. Specifically, the absorbed amount of the medium S is 10−6=4 g/m². The calculated absorbed amount also indicates an amount absorbed by at least the medium S in the two-pass printing.

To dry the third patch 73 with color density level 3, an amount obtained by subtracting the absorbed amount from the liquid amount corresponding to color density level 3 can be evaporated. Specifically, it is found that the evaporating is of an amount of ink of 15−4=11 g/m² by heating caused by the drying unit 50. Referring to the graph illustrated in FIG. 6, an evaporation amount of 11 g/m² in the two-pass printing is found at about a heating temperature of 80° C. In other words, changing the heating temperature of the drying unit 50 from 60° C. to 80° C. provides a drying capability for drying the third patch 73.

As a result, in one exemplary embodiment, the user may refer to the graph illustrated in FIG. 6 based on the dry condition of the patches 70. The heating temperature of the drying unit 50 can be properly adjusted by referring to the correspondence relationship between a heating temperature of the drying unit 50 and an evaporation amount of liquid caused by the drying unit 50.

In printing an image by selecting a desired image quality and a desired color density, it may be burdensome for a user to adjust the heating temperature of the drying unit 50 by referring to a graph as illustrated in FIG. 6. In this regard, the printing apparatus 11 according to one exemplary embodiment provides correspondence data for reducing such user burden in adjusting the heating temperature, for example, through a manual or the like attached to the printing apparatus 11.

Refer to the graph illustrated in FIG. 6. The evaporation amount against the heating temperature changes almost linearly in a range of heating temperatures from 60° C. to 100° C., which are generally used by the drying unit 50 to dry the medium S. Accordingly, the graph for the four-pass printing is approximated to a linear function in the range of heating temperatures from 60° C. to 100° C., as the evaporation amount increases by about 5 g/m$^2$ for every 10° C. increase in the heating temperature. The graph for the two-pass printing is approximated to a linear function in the range of heating temperatures from 60° C. to 100° C., as the evaporation amount increases by about 5 g/m$^2$ for every 20° C. increase in the heating temperature.

In one exemplary embodiment, the liquid amount corresponding to color density level 1 is set to 5 g/m$^2$. Accordingly, an increase in the evaporation amount when the heating temperature increases by 10° C. in the four-pass printing corresponds to an increase in the liquid amount when the color density level increases by one. An increase in the evaporation amount when the heating temperature increases by 20° C. in the two-pass printing corresponds to an increase in the liquid amount when the color density level increases by one. Accordingly, in one exemplary embodiment, an increase in the evaporation amount caused by an increase in the heating temperature can replace an increase in the liquid amount caused by an increase in the color density level. As a result, an increase in the heating temperature for drying an amount of liquid increase due to an increase by one in the color density level can be found for each number of passes to be selectable in the printing apparatus 11. This enables a proper adjustment of the heating temperature of the drying unit 50, based on the dry condition of the patches 70 of the check pattern 90.

For example, it is assumed that when the check pattern 90 is checked in the four-pass printing, the third patch 73 is fully dry, but the fourth path 74 is not fully dry. In this situation, it is found that the current heating temperature of the drying unit 50 dries the third patch 73 with color density level 3. As described above, when the heating temperature of the drying unit 50 increases by 10° C. in the four-pass printing, the evaporation amount increases by an increase in the liquid amount corresponding to an increase by one in the color density level. Accordingly, it is found that an increase by 10° C. in the heating temperature of the drying unit 50 dries the fourth patch 74 with color density level 4.

For example, it is assumed that when the check pattern 90 is checked in the two-pass printing, the second patch 72 is fully dry, but the third path 73 is not fully dry. In this situation, it is found that the current heating temperature of the drying unit 50 dries the second patch 72 with color density level 2. As described above, when the heating temperature of the drying unit 50 increases by 20° C. in the two-pass printing, the evaporation amount increases by an increase in the liquid amount corresponding to an increase by one in the color density level. Accordingly, it is found that an increase by 20° C. in the heating temperature of the drying unit 50 dries the third patch 73 with color density level 3.

Figure 7:
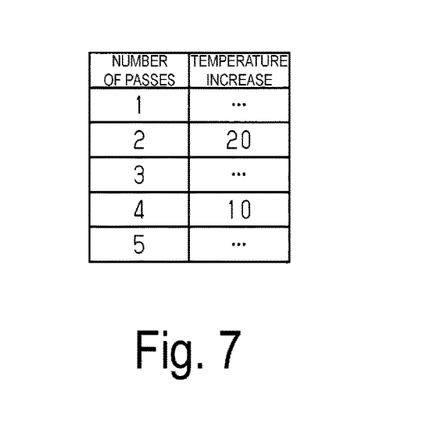
FIG. 7 is a table as an example of correspondence data.

A table illustrated in FIG. 7 indicates that an increase in the heating temperature for evaporating an increased amount of liquid due to one increase in the color density level is associated with any one of the numbers of passes to be selectable in the printing apparatus 11. In other words, the table illustrated in FIG. 7 indicates that a numerical value obtained by approximation as described above is associated with any one of the numbers of passes to be selectable in the printing apparatus 11. In one exemplary embodiment, illustrated are an increase in the heating temperature in the case where the printing unit 40 performs four-pass printing and an increase in the heating temperature in the case where the printing unit 40 performs two-pass printing, as typical examples.

A user multiplies the temperature increase indicated in the table illustrated in FIG. 7 by a numeral value corresponding to a difference in color density level between the patch 70 with the highest color density level out of the patches 70 which are fully dry in the case of the current heating temperature, and a desired patch 70 which is not fully dry. This enables the user to find an increase in the heating temperature for drying the desired patch 70. In other words, the table illustrated in FIG. 7 indicates a correspondence relationship between a heating temperature of the drying unit 50 and an evaporation amount of ink caused by the drying unit 50. In still other words, the table is set depending on a difference in heating time of the drying unit 50 to be selectable in the printing apparatus 11 (for each number of passes of the printing unit 40).

The printing apparatus 11 according to one exemplary embodiment provides the table as illustrated in FIG. 7, for example, through a manual or the like attached to the printing apparatus 11. The table illustrated in FIG. 7 is an example of correspondence data indicating a correspondence relationship between a heating temperature of the drying unit 50 and an evaporation amount of liquid caused by the drying unit 50. The table illustrated in FIG. 7 may be provided through an electronic manual electronically stored in the printing apparatus 11.

In this way, the user checks the dry condition of the patches 70 of the check pattern 70 and then refers to the correspondence data such as the table illustrated in FIG. 7. This enables the user to find a heating temperature for drying the selected patch 70. This enables the user to quite clearly recognize an increase in the heating temperature for drying an image printed at a desired color density, as compared with the reference to the graph illustrated in FIG. 6.

The user refers to the correspondence data indicating a correspondence relationship between a heating temperature of the drying unit 50 and an evaporation amount of liquid caused by the drying unit 50, based on the dry condition of the patches 70 of the check pattern 90. This enables the user to find a heating temperature for drying the medium S when the user prints an image at a desired image quality and a desired color density.

According to some exemplary embodiments, the following advantages can be obtained.

(1) Depending on the heating temperature of the drying unit 50, after the medium S on which the plurality of patches 70 are printed is subject to drying by the drying unit 50, the medium S may include a fully dried patch(es) 70 and a not-fully dried patch(es) 70. In that case, it is observed that when an image is printed on the medium S at a liquid amount that is equal to the liquid amount of the latter patch(es) 70, the current heating temperature of the drying unit 50 results in insufficient drying.

Here, by referring to the correspondence data indicating the correspondence relationship between the heating temperature of the drying unit 50 and the amount of evaporation of liquid caused by the drying unit 50, a difference in amount of liquid between a fully dried patch 70 and a not-fully dried patch 70 is determined and thus a heating temperature of the drying unit 50 for drying the latter patches 70 is obtained.

According to one exemplary embodiment described above, the heating temperature of the drying unit 50 for drying the medium S on which an image is printed at a desired liquid amount can be calculated based on the dry condition of the plurality of patches 70 printed on the medium S. Therefore, the medium S can be properly dried. (2) The correspondence data is set depending on different heating time of the drying unit 50 for the medium S, based on the number of passes to be selectable in the printing apparatus 11. Accordingly, the heating temperature of the drying unit 50 for drying the medium S on which an image is printed at a desired liquid amount can be calculated depending on different heating time of the drying unit 50. (3) Since the plurality of patches 70 each having a different liquid amount are printed on the medium S again after the heating temperature of the drying unit 50 is adjusted, it is possible to check whether the heating temperature of the drying unit 50 is properly adjusted, based on the dry condition of the plurality of patches printed again.

Some exemplary embodiments described above may be modified as follows. The following modifications may be combined with each other as appropriate.

The heating temperature of the drying unit 50 may be adjusted to suppress over-drying of the medium S by referring to the correspondence data depending on the dry condition of the check pattern 90. In other words, an increase in temperature described in the correspondence data illustrated in FIG. 7 is referred to as a decrease in temperature.

For example, it is assumed that a user has selected four-pass printing by the printing unit 40 and color density level 1 of an image. In addition, it is assumed that the first patch 71 and the second patch 72 are fully dry, but the third patch 73, the fourth patch 74, and the fifth patch 75 are not fully dry, in the check pattern 90. In this situation, it is found that at the current heating temperature, the drying unit 50 is capable of drying an amount of liquid corresponding to color density level 2. Accordingly, in the case where the image is printed at color density level 1, the current heating temperature may overdry the medium S. In such a case, by decreasing the heating temperature by 10° C. which is obtained as a decrease in temperature by referring to the correspondence data illustrated in FIG. 7, the medium S can be prevented from overdrying.

As an example of the correspondence data, the graph illustrated in FIG. 6 may be provided through a manual or the like attached to the printing apparatus 11. In this case, with a liquid amount for each color density level which is also provided through the manual or the like, a heating temperature of the drying unit 50 is calculated to print an image at a desired liquid amount as the user wishes.

The correspondence data as illustrated in FIG. 7 may be printed along with the check pattern 90 when the check pattern 90 is printed on the medium S. As an example of the correspondence data, text that indicates a correspondence relationship between a heating temperature of the drying unit 50 and an evaporation amount of ink caused by the drying unit 50 may be provided through a manual and the like attached to the printing apparatus 11, instead of the table illustrated in FIG. 7. Specifically, as an example of the correspondence data, text that indicates an increase in the heating temperature for drying an image may be provided as "To dry a patch with a color density level higher by one in four-pass printing, increase the heating temperature by 10° C."

The printing apparatus 11 may be configured not to print the check pattern 90. Specifically, the heating temperature of the drying unit 50 may be adjusted, based on the dry condition of the patches 70 of the color pattern 60.

As a scale indicating a liquid amount forming each patch 70, print duty may be used instead of color density level. The print duty indicates a coverage of liquid on the medium S, that is, an area ratio of areas occupied by liquid on the medium S to the medium S.

The adjustment of the heating temperature of the drying unit 50 may be performed by a control unit, such as a central processing unit (CPU), configured to overall control the operation of the printing apparatus 11. In such a configuration, the user identifies the patch 70 with the highest color density of the patches 70, which are fully dried at the current heating temperature by checking the check pattern 90, and then inputs the color density level of the identified patch 70, and thus the control unit can adjust the heating temperature to a temperature appropriate to dry the medium S by referring to the correspondence data stored in the control unit.

The printing apparatus 11 may be capable of selecting six or more passes for printing. The number of passes to be selectable in the printing apparatus 11 is not limited to one of consecutive numbers. For example, the selectable number of passes may be one of discrete numbers, such as one-pass, two-pass, four-pass, and eight-pass.

The patch group 80 in each of the color pattern 60 and the check pattern 90 is not limited to a configuration with a single color ink. For example, the patch group 80 may be formed by mixing different color inks. The printing apparatus 11 may be a fluid jet apparatus configured to jet or discharge fluid other than ink (including, for example, liquids, liquid materials obtained by dispersing or mixing particles of a functional material in a liquid, and fluid materials like a gel). For example, the printing apparatus 11 may be a liquid-material jet apparatus configured to jet a liquid material, which includes material such as an electrode material, or a color material (pixel material) used in the manufacture of liquid crystal displays, electroluminescence (EL) displays, surface emitting displays, and the like in a dispersed or dissolved form. The printing apparatus 11 may be a fluid-material jet apparatus configured to jet a fluid material such as a gel (e.g., physical gel). The disclosure can be applied to one of such types of fluid jet apparatuses. In this specification, the term "fluid" refers to a concept excluding a fluid containing gas solely. The fluid includes, for example, liquids (inorganic solvent, organic solvent, solution, liquid resin, liquid metal, molten metal, and so on), liquid materials, and fluid materials.

This application claims priority under 35 U.S.C. § 119 to Japanese Patent Application No. 2017-130290, filed Jul. 3 2017. The entire disclosure of Japanese Patent Application No. 2017-130290 is hereby incorporated herein by reference.

What is claimed is:

1. A method for adjusting a printing apparatus, the method comprising:
   printing on a medium a plurality of patches having different amounts of liquid discharged from a printing unit;
   subjecting the plurality of patches to a drying operation using a drying unit configured to heat the medium;

determining a dry condition of the plurality of patches; and adjusting a heating temperature of a drying unit based on the determined dry condition of the plurality of patches, and based on correspondence data indicating a relationship between a heating temperature of the drying unit and an amount of evaporation of the liquid caused by the drying unit.

2. The method according to claim 1, wherein the correspondence data is set depending on a difference in a heating time of the drying unit for heating the medium.

3. The method according to claim 2, further comprising: after adjusting the heating temperature of a drying unit, printing on the medium a second plurality of patches having different amounts of the liquid.

4. The method according to claim 1, further comprising: after adjusting the heating temperature of a drying unit, printing on the medium a second plurality of patches having different amounts of the liquid.

* * * * *